United States Patent [19]

Fujii

[11] 4,242,172
[45] Dec. 30, 1980

[54] METHOD OF PRESS-FORMING CORRUGATED PAPERBOARD INTO CURVED BOARD AND APPARATUS FOR SAME

[75] Inventor: Toshihiko Fujii, Atsugi, Japan

[73] Assignee: Nissan Motor Company, Limited, Yokohama, Japan

[21] Appl. No.: 941,741

[22] Filed: Sep. 12, 1978

[51] Int. Cl.³ .............................................. B32B 31/00
[52] U.S. Cl. ..................... 156/499; 156/224; 156/558; 156/563
[58] Field of Search ................. 156/221-224, 156/499, 500, 556-558, 196, 205, 210, 563; 264/322; 425/397, 400, 508, 509, 520-521

[56] References Cited

U.S. PATENT DOCUMENTS

| | | | |
|---|---|---|---|
| 3,367,823 | 2/1968 | Clausen et al. | 156/557 X |
| 3,539,416 | 11/1970 | Sanders et al. | 156/499 |
| 3,904,466 | 9/1975 | Jones et al. | 156/499 X |
| 4,032,387 | 6/1977 | Sugiyama et al. | 156/556 X |
| 4,093,482 | 6/1978 | Ogata et al. | 156/196 X |
| 4,124,421 | 11/1978 | Fujii | 156/221 X |

FOREIGN PATENT DOCUMENTS 2081619 10/1971 France .
1297742 11/1972 United Kingdom .

Primary Examiner—David A. Simmons

[57] ABSTRACT

In a method of press-forming a planer board of corrugated paperboard into a curved board which serves as the substrate of, for example, an automobile roof trim board by utilizing a thermoplastic adhesive in the production of the corrugated paperboard and applying heat to the planer board through dies in a hot-press, the liners of the corrugated paperboard are prevented from wrinkling by preheating the planer board so as to soften the thermoplastic adhesive therein immediately before placement between the dies. An apparatus to perform this method comprises a board carrier which has heaters and can carry the planer board into the hot-press with continued heating of the board.

4 Claims, 4 Drawing Figures

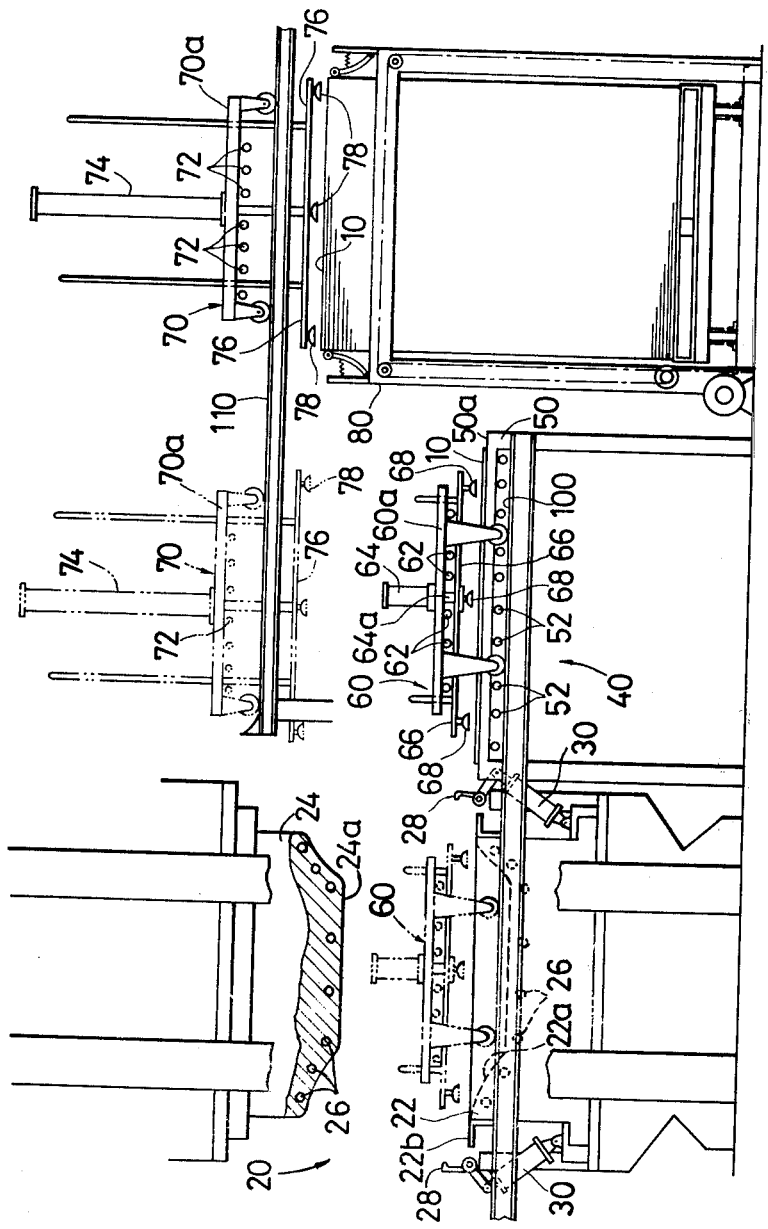

METHOD OF PRESS-FORMING CORRUGATED PAPERBOARD INTO CURVED BOARD AND APPARATUS FOR SAME

BACKGROUND OF THE INVENTION

This invention relates to a method of press-forming a planer sheet of corrugated paperboard produced by utilizing a thermoplastic adhesive into an at least partly curved board which serves as the substrate of a wall covering material for the interior of cars, ships or buildings and an apparatus for performing the method.

As disclosed in U.S. Pat. No. 4,093,482, corrugated paperboard is useful as a basic material for wall covering board materials to afford comforts and/or decorative effects to the interior of cars, ships or buildings because of its light weight and good heat and sound insulating ability. This fact has attracted increasing attention in related industries. In automobiles, for example, trim boards such as roof trims and door trims of corrugated paperboard base have already been in practical use on industrial scale.

Trim boards of this type usually consist of a corrugated paperboard substrate and a skin or facing layer which is laid on one side of the substrate for producing protective, decorative and/or cushioning effects. In most cases double-faced corrugated paper board is used as the material of the substrate, while a variety of soft and pliable sheet materials are useful as the facing layer: examples are plastics sheets, artificial leathers, woven or nonwoven cloths and laminated materials given by backing any of these sheet materials with a cushioning layer such as a urethane foam layer.

When a wall or panel to be covered with a trim board of the above described type has a curved surface as is usual in automobile roofs, it becomes a principal step in the production of the trim board to shape a planer sheet of corrugated paperboard into an at least partly curved board, which serves as the substrate of the trim board, in compliance with the curved surface of the object. Such shaping of corrugated paperboard is accomplished by application of pressure through male and female dies appropriately arranged in a press, and then the facing layer is bonded to the shaped substrate.

Considering that corrugated paperboard is inherently poor in ductility, the above quoted U.S. Pat. No. 4,093,482 requires that corrugated paperboard as the substrate material be of the type comprising a thermoplastic resin as the adhesive to bond paper liners to a corrugated paper medium and that press-forming of the corrugated paperboard substrate be performed with application of heat to the material, i.e. by means of a hot-press. According to this patent, the thermoplastic resin adhesive in the corrugated paperboard subjected to press-forming is sufficiently softened or fluidized and, as a consequence, permits a certain extent of relative displacement of the corrugated medium and the individual liners while pressure is applied thereto, so that the corrugated paperboard can be shaped smoothly without leaving unwanted strains therein. Since the thermoplastic resin solidifies after completion of the press-forming, the curved substrate can retain its shape and resist deformation by external forces and changes in the environmental condition. Thus, it is an ingenious point of this method that the thermoplastic resin serves as a sort of lubricant during press-forming but affords rigidity to the shaped substrate.

Sometimes use is made of a special type of corrugated paperboard whose paper liners (optionally corrugated medium, too) are impregnated with a thermoplastic resin for the enhancement of stability and moisture resistance as the substrate material. This type of corrugated paperboard too can be press-formed by the method according to U.S. Pat. No. 4,093,482 since the application of heat to the corrugated paperboard during press-forming causes not only fluidization of the thermoplastic adhesive but also softening, i.e. lowering of rigidity, of the resin-impregnated liners.

However, a curved substrate of corrugated paperboard produced by the above described method is often unsatisfactory in its appearance because wrinkles tend to appear in curved regions particularly on one side which gives a concave surface. The probability of such wrinkling increases when the corrugated paperboard is subjected to relatively deep drawing or severe bending with a comparatively small bend radius. According to my recognition, a primary reason for such wrinkling is that actual bending of the substrate material begins while heating of the substrate material is yet insufficient.

In a hot-press for the press-forming operation, both male and female dies are heated so that heating of the substrate material is effected by heat conduction through these dies. Usually the female die is kept stationary. When the board is placed on the stationary female die a large portion of the board is spaced from the shaped face of this die. Then the male die is lowered so as to press the board against the female die, but during an initial stage of pressing the contact of the shaped face of the male die with the planer board is established only in a limited area, so that the board begins to undergo bending even in regions still spaced from the male die, i.e. in regions not yet heated by the male die. Accordingly it is highly probable that the corrugated paperboard undergoes bending in some regions before fluidization of the thermoplastic adhesive therein with the result that wrinkles appear in concaved regions of the liner contacted with the male die. Even when the wrinkled liner is laid with a facing layer, the outer surface of the facing layer tends to show visible traces of the wrinkles since the facing layer is a thin sheet of a soft and pliable material. The presence of such traces of course impairs the decorative effect and hence commercial value of the trim board.

SUMMARY OF THE INVENTION

It is an object of the present invention to provide an improved method of press-forming corrugated paperboard of the above described type into an at least partly curved board to serve as the substrate of a trim board of the described use, which method is effective for prevention of wrinkling of the corrugated paperboard during press-forming.

It is another object of the invention to provide an apparatus for industrially performing a method according to the invention.

The invention, is one aspect thereof, is concerned with a method of press-forming a planer board of corrugated paperboard, which is of the type utilizing a thermoplastic resin as the adhesive to bond paper liners to a corrugated paper medium, into an at least partly curved board by means of a hot-press fitted with stationary and movable dies respectively having suitably shaped die faces. The method includes the steps of heating the stationary and movable dies, placing the planer board on the heated stationary die and then pressing the planer board against the die face of the heated stationary die by the heated movable die. As the improvement according to the invention, the planer board is preheated before the placement thereof on the heated stationary die. The preheating is commenced before the introduction of the planer board into the hot-press and is effected to such an extent that the thermoplastic resin in the planer board softens before the contact of the board with the heated stationary die.

Softening of the adhesive layers in the planer board caused by the preheating means weakening of the adhesion strength between the corrugated medium and the liners of the board. When the planer board undergoes bending in this state, therefore, the liners and the corrugated medium are permitted of a certain extent of relative slipping or displacement, so that the board does not make undue resistance to the bending force. As a consequence, almost no wrinkles appear on the liners of the press-formed board even in regions concaved with relatively small bend radii.

It is preferable to accomplish the preheating of the planer board during conveyance of the planer board into the hot-press since then the preheated board exhibits substantially no lowering of temperature before the placement thereof on the stationary die. Besides, this manner of preheating is particularly profitable in the case of industrially performing a method according to the invention since the preheating can be accomplished while another sheet of planer board (preheated) undergoes press-forming in the hot-press and, accordingly, press-forming of a number of sheets of planer boards can be accomplished practically continuously or with only very short time intervals.

Usually the preheating is effected substantially over the entire area of the planer board. However, sometimes it will be sufficient to preheat only a limited area or areas of the planer board when it is intended to bend the board only locally.

In another aspect, the invention provides a press-forming apparatus comprising a hot-press fitted with heatable stationary and movable dies, a board carrier which can carry the planer board into the hot-press and place the carried board on the stationary die while the movable die is parted from the stationary die and at least one heater mounted on the carrier so as to heat the planer board carried by the carrier.

BRIEF DESCRIPTION OF THE DRAWINGS

FIG. 3 shows a press-forming apparatus according to the invention in a side elevational view.

DESCRIPTION OF THE PREFERRED EMBODIMENTS

Figure 1:
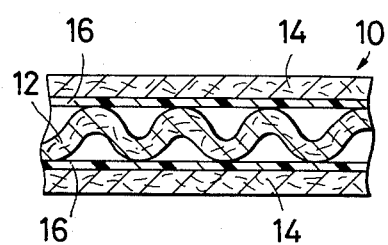
FIG. 1 is a fragmentary and sectional view of a planer sheet of corrugated paperboard to be shaped by a press-forming method of the invention.

FIG. 1 shows the structure of a planer board 10 to be shaped into an at least partly curved board by a press-forming method according to the invention. This board 10 is a double-faced corrugated paperboard given by covering both sides of a corrugated paper medium 12 with paper liners 14. If desired, however, a single-face board (only one side of a corrugated medium is covered with a liner) can be employed as the object of a press-forming method of the invention. The bonding of the liners 14 to the corrugated medium 12 is achieved by means of adhesive layers 16 which are initially coated on the inner surfaces of the respective liners 14. The material of the adhesive layers 16 is a thermoplastic resin. The coating of each liner 14 with the thermoplastic adhesive may be done by the application of the adhesive in liquid form, but usually it is more convenient to utilize a hot-melt sheet such as a polyethylene film as the material of the adhesive layers 16. Optionally, the liners 14 and/or the corrugated medium 12 may be impregnated with a thermoplastic resin in advance of the bonding of the liners 14 to the corrugated medium 12.

Figure 2:
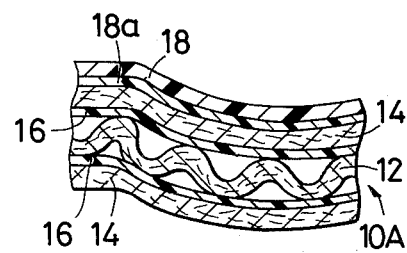
FIG. 2 is a fragmentary and sectional view of a trim board obtained by laminating a corrugated paperboard substrate shaped by a method of the invention with a facing layer.

According to the invention, the planer board 10 is preheated to soften the thermoplastic adhesive layers 16 as will be described hereinafter in detail and, successively, is shaped into an at least partly curved board by means of a hot-press fitted with heated male and female dies. FIG. 2 shows a trim board consisting of a corrugated paperboard substrate 10A press-formed by a method according to the invention and a facing layer 18 of a soft and pliable material bonded to the substrate 10A with an adhesive 18a. It is possible to bond the facing layer 18 to the substrate 10A by applying a fluid adhesive to the shaped substrate 10A, but in most cases it is more convenient to utilize a hot-melt sheet such as a polyethylene film as the adhesive 18a. In the latter case, the facing layer 18 is placed on the shaped substrate 10A with the interposal of the hot-melt sheet 18a therebetween (the hot-melt sheet 18a may be bonded to the back side of the facing layer 18 in advance) and pressed against the substrate 10A by means of a heated die.

Referring to FIG. 3, a press-forming method according to the invention utilizes a conventional hot-press 20 similarly to the prior art method. The hot-press 20 has a stationary die 22 (which is a female die in this case) in a lower position and a vertically movable male die 24 above the stationary die 22. The upper surface 22a of the female die 22 and the lower surface 24a of the male die 24 are shaped in accordance with the intended shape of the corrugated paperboard substrate 10A. Heating pipes 26 are embedded in both the stationary and movable dies 22, 24 so that the dies 22, 24 can be heated to desired temperatures by passing an appropriately heated fluid through these pipes 26 from an external heat source (not shown). Along the periphery of the shaped face 22a, the stationary die 22 is provided with at least a pair of clamp mechanisms 28 each coupled with a hydraulic or pneumatic cylinder 30. When the planer sheet 10 of corrugated paperboard, which has a plan view geometry suitable to the production of the curved substrate 10A, is placed on the stationary die 22 these clamp mechanisms 28 firmly hold the planer board 10 in its peripheral regions pressed against the stationary die 22.

According to the invention, the planer board 10 is preheated at the outside of the hot-press 20 before, preferably immediately before, the placement of the board 10 on the stationary die 22 so that the movable die 24 may come into contact with the board 10 while the board 10 retains the effect of the preheating. The intensity and duration of the preheating are made such that the thermoplastic adhesive layers 16 such as ones provided by hot-melt sheets soften sufficiently and come near to fluidizing, but it is undesirable to cause fluidization of the adhesive layers 16 by the preheating because of the possibility of the liners 14 separating from the corrugated medium 12 during conveyance of the preheated board 10 into the hot-press 20. In principle any heating means may be employed for preheating the planer board 10, but in practice it is convenient to utilize electric heaters because of ease in controlling the intensity of heating. As mentioned hereinbefore, it is preferable to accomplish the preheating of the planer board 10 during conveyance of the board 10 into the hot-press 20. Preferably the board 10 is heated from both sides. When the preheating is effected only from one side of the board 10, the board 10 is placed on the stationary female die 22 such that the preheated side of the board 10 faces the male die 24.

FIG. 3 shows an apparatus for industrially performing the above described press-forming method according to the invention. This apparatus includes the hot-press 20 and, besides, comprises a system 40 which serves for both conveyance of the planer board 10 into the hot-press 20 and preheating of the board 10. The conveyance-preheating system 40 comprises a table 50 which stands beside the hot-press 20 with its top surface 50a nearly on the same level as the uppermost part of the surface 22a of the stationary die 22, a pair of rails 100 which extend horizontally straight at an altitude close to the height of the table 50 such that both the stationary die 22 and the table 50 are located between the rails 100, and a first carrier 60 which can move on the rails 100 in either direction. In addition, the system 40 comprises another pair of rails 110 which extend horizontally straight at an altitude greater than the height of the table 50 from a space right above the table 50 in a direction opposite to the hot-press 20, a second carrier 70 which can move on the rails 110 in either direction and a board lifter 80 which is placed beneath the rails 110 to hold a stack of planer boards 10 such that the uppermost one of the stacked boards 10 comes to a level shortly below the rails 110.

The top 50a of table 50 is wide enough to support the planer board 10 thereon. Preferably the top 50a of the table 50 takes the form of grating or screen and heaters such as infrared ray lamps 52 are provided beneath the table top 50a so as to heat the board 10 placed on the table top 50a substantially over the entire area of the board 10.

The first carrier 60 is a wheeled platform and has a hydraulic or pneumatic cylinder 64 arranged such that its piston rod 64a can extend vertically downwards and retract upwards. Fixed to the piston rod 64a are horizontally extending arms 66 and attached thereto are vacuum cups 68 which are directed downwards so as to suck up the planer board 10 placed on the table 50 when suction is effected. The carrier 60 has heaters such as infrared ray lamps 62 arranged beneath the platform 70a but above the arms 66 in the upwardly retracted position so as to heat substantially entire area of the board 10 held by the vacuum cups 68.

The second carrier 70 is identical with the first carrier 60 and comprises a cylinder 74, horizontal arms 76 fixed to the piston rod 74a, vacuum cups 78 attached to the arms 76 and infrared ray lamps 72 arranged beneath the platform 70a. The cylinder 74 and the arms 76 are arranged such that the vacuum cups 78 can pick up the uppermost one of the planer boards 10 stacked on the lifter 80. The lamps 72 can heat the planer board 10 held by the vacuum cups 78 from the upside.

The first and second carriers 60 and 70 can be moved independently, and the lamps 52, 62 and 72 can be lighted and put out respectively at desired moments.

If desired, electrical circuits for the lamps 52, 62 and 72 may be made such that only a selected portion of the respective groups of lamps 52, 62 and 72 can be lighted when it is sufficient to preheat only a limited area or areas of the planer board 10.

By utilizing the illustrated apparatus, a press-forming method according to the invention is performed in the following way.

Initially the first carrier 60 is positioned above the stationary die 22 in the hot-press 20, or on the left side of the press 20, so as to clear the top 50a of the table 50. The second carrier 60 is moved to rest above the board lifter 80. Then the infrared ray lamps 72 are lighted and the cylinder 74 is actuated to lower the arms 76 until the vacuum cups 78 are pressed against the uppermost one of the planer boards 10 of corrugated paperboard stacked on the lifter 80. Upon application of vacuum, the vacuum cups 78 catch the board 10. Then the arms 76 are pulled up so that the board 10 caught by the vacuum cups 78 nears the lighted lamps 72. In this state the carrier 70 is moved to the left to rest above the table 50, so that the board 10 beneath the arms 76 is gradually heated during the travel of the carrier 70. The cylinder 74 is actuated to lower the arms 74, and the planer board 10 is placed on the table 50 by interrupting the application of vacuum to the vacuum cups 78. The infrared ray lamps 52 of the table 50 are lighted in advance. Then the arms 76 are pulled up and the lamps 72 are put out. At the same time, the lamps 64 of the first carrier 60 are turned on, and the first carrier 60 is moved to the right to rest above the table 50 while the second carrier 70 is moved towards the board lifter 80.

Next, the cylinder 64 of the first carrier 60 is actuated to lower the arms 66 until the vacuum cups 68 come into contact with the board 10 on the table 50, followed by application of vacuum to the cups 68. Then the piston rod 64a is retracted upwards to pull up the board 10 to a position close to the lighted lamps 62. In this state the first carrier 60 is moved into the hot-press 20 so as to rest above the stationary die 22. The dies 22 and 24 are already heated when the carrier 60 arrives in the hot-press 20. The planer board 10 carried by the first carrier 60 is placed on the stationary die 22 by lowering the arms 66 and interrupting application of vacuum to the vacuum cups 68. By actuation of the cylinders 30, the clamp mechanisms 28 firmly hold the board 10 in its peripheral regions against the stationary die 22. Simultaneously the first carrier 60 is made to go out of the hot-press 20. Thereafter the movable die 24 is lowered so as to press the planer board 10 against the shaped face 22a of the stationary die 22.

By using the illustrated apparatus it is possible to preheat a next sheet of planer board 10 during the conveyance thereof into the hot-press 20 while the board 10 preheated and carried into the hot-press 20 through the above described procedures undergoes press-forming (the press-forming step takes a certain length of time because of the need of fluidizing the adhesive layers 16).

Since the planer board 10 is preheated to such an extent as causes softening of the thermoplastic adhesive layers 16 during its transfer from the board lifter 80 to the hot-press 20, the board 10 pressed by the movable die 24 undergoes bending with considerably weakened adhesion strength between the corrugated medium 12 and the liners 14. The fluidized or nearly fluidized adhesive layers 16 permit the liners 14 to make slipping displacement relative to the corrugated medium 12, so that the board 10 can be press-formed smoothly without wrinkling of the liners 14 in drawn or stretched regions. When the liners 14 (sometimes the corrugated medium 12, too) are impregnated with a thermoplastic resin, the preheating of the planer board 10 produces an additional effect that there occurs an appreciable lowering of the rigidity of the board 10 as a whole before the contact of the movable die 24 with the board 10. This is also favorable to smooth bending of the board 10.

As will be understood from the foregoing description, the first carrier 60 (together with the rails 100 or an alternative guide means) is an essential component of the conveyance-preheating system 40. That is, the second carrier 70 and the rails 110 may be omitted or replaced by a suitable alternative. The position of the table 50, i.e. the distance to be travelled by the first carrier 60, may be varied depending on an intended duration of the preheating.

Figure 4:
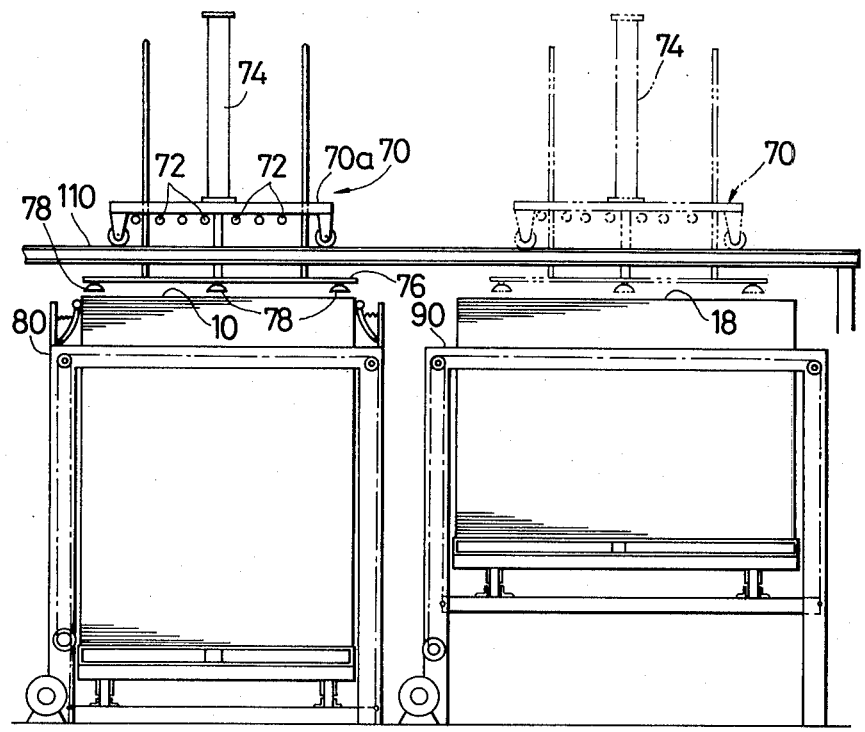
FIG. 4 shows the addition of an optional component to the apparatus of Fig. 3 in the same view.

When it is intended to perform bonding of the facing layer 18 to the shaped substrate 10A successively to the above described press-forming operation, the apparatus of FIG. 3 may be supplemented with another lifter 90 as shown in FIG. 4 to hold facing sheets 18 (each with the hot-melt sheet 18a applied to the lower surface) in a pile. In this case the rails 110 extend such that the second carrier 70 can be moved to a position right above this lifter 90. While the first carrier 60 carries the planer board 10 into the hot-press 20, the second carrier 60 carries a sheet of facing layer 18 from the lifter 90 to the table 50. At this stage, neither the lamps 72 of the second carrier 70 nor the lamps 52 of the table 50 are lighted. Following the press-forming of the board 10 into the curved substrate 10A, the first carrier 60 takes the facing layer 18 into the hot-press 20 without lighting the lamps 62. The carried facing layer 18 is placed on the substrate 10A retained in the stationary die 22, and the heated movable die 24 is lowered to press the facing layer 18 against the shaped substrate 10A.

What is claimed is:

1. An apparatus for press-forming a planer board of corrugated paperboard into an at least partly curved board, the corrugated paperboard being of the type utilizing a thermoplastic resin as the adhesive to bond paper liners to a corrugated paper medium, the apparatus comprising:

a hot-press fitted with a heatable and stationary female die and a heatable and vertically movable male die above said stationary female die;
a table standing beside said hot-press, the top of said table being wide enough to support thereon said planer board substantially horizontally;
a pair of rails extending horizontally alongside said hot-press and said table;
a wheeled carrier which can move on said rails in either direction and has board-holding means for taking up said planer board from the top of said table, holding said planer board during movement of said carrier on said rails and laying said planer board on said stationary female die;
at least one electric heater attached to said carrier in such an arrangement that said planer board held by said carrier is spaced downwards from said electric heater and can be preheated by said electric heater to such an extent that said thermoplastic resin in said planer board softens before said planer board is placed on said stationary female die;
another pair of rails extending horizontally at an altitude greater than the height of said table from a space above said table in a direction opposite to said hot-press;
a rack which supports a stack of said planer boards and is located beneath said another pair of rails and at a distance from said table;
another wheeled carrier which can move on said another pair of rails in either direction and has board-holding means for taking up said planer board from said rack, holding said planer board while said another carrier moves on said another pair of rails and laying said planer board on said table;
and at least one electric heater attached to said another carrier in such an arrangement that said planer board held by said another carrier is spaced downwards from said heater of said another carrier and can be heated by said heater of said another carrier.

2. An apparatus as claimed in claim 1, wherein said board-holding means comprise a piston cylinder having a piston rod downwardly extendable and upwardly retractable, arms horizontally extending from said piston rod and a plurality of vacuum cups attached to said arms and directed downwards.

3. An apparatus as claimed in claim 1 or 2, wherein said table is provided with at least one electric heater beneath the top thereof, said top being apertured such that said planer board placed on said table can be heated by said heater of said table.

4. An apparatus as claimed in claim 1, wherein said board-holding means of said another carrier comprise a piston cylinder having a piston rod downwardly extendable and upwardly retractable, arms horizontally extending from said piston rod and a plurality of vacuum cups attached to said arms and directed downwards.

* * * * *